(12) United States Patent
Roy et al.

(10) Patent No.: US 11,265,845 B2
(45) Date of Patent: Mar. 1, 2022

(54) BACKUP PAGING OPPORTUNITIES IN NEW RADIO UNLICENSED

(71) Applicant: MEDIATEK Singapore Pte. Ltd, Singapore (SG)

(72) Inventors: Abhishek Roy, San Jose, CA (US); Chia-Chun Hsu, Hsin-Chu (TW)

(73) Assignee: MediaTek Singapore Pte. Ltd., Singapore (SG)

( * ) Notice: Subject to any disclaimer, the term of this patent is extended or adjusted under 35 U.S.C. 154(b) by 9 days.

(21) Appl. No.: 16/862,503

(22) Filed: Apr. 29, 2020

(65) Prior Publication Data
US 2020/0351822 A1 Nov. 5, 2020

Related U.S. Application Data

(60) Provisional application No. 62/841,892, filed on May 2, 2019.

(51) Int. Cl.
*H04W 68/02* (2009.01)
*H04W 68/00* (2009.01)
(Continued)

(52) U.S. Cl.
CPC .......... *H04W 68/02* (2013.01); *H04W 16/14* (2013.01); *H04W 68/005* (2013.01);
(Continued)

(58) Field of Classification Search
CPC ... H04W 68/02; H04W 68/005; H04W 76/28; H04W 74/0808; H04W 76/27; H04W 16/14; Y02D 30/70
(Continued)

(56) References Cited

U.S. PATENT DOCUMENTS

| 2008/0207229 A1* | 8/2008 | Cave | H04W 52/0209 |
| | | | 455/458 |
| 2015/0017982 A1* | 1/2015 | Klatt | H04W 36/14 |
| | | | 455/434 |

(Continued)

FOREIGN PATENT DOCUMENTS

| CN | 108702731 A | 2/2016 |
| EP | 3244671 A1 | 1/2016 |

(Continued)

OTHER PUBLICATIONS

Search Report and Written Opinion of Taiwan IP office for 109114536, dated Mar. 12, 2021 (8 pages).

(Continued)

*Primary Examiner* — Inder P Mehra
(74) *Attorney, Agent, or Firm* — Imperium Patent Works; Zheng Jin

(57) ABSTRACT

A method to improve paging process by including additional backup paging opportunities in new radio unlicensed (NR-U) systems is proposed. To cope with the downlink transmission impairments arising from possible listen-before-talk (LBT) failures, NR-U user equipment (UE) can listen the additional paging opportunities (POs) to get the paging message. In an efficient mechanism, additional backup paging opportunities are configured while minimizing the UE's power consumption. The invention also reduces UE's power consumption by configuring short and micro sleep cycles between successive backup paging opportunities. In addition, to avoid continuous listening to the backup paging opportunities, paging monitoring can be suspended for a UE if the LBT is successful and the paging is not intended for the UE.

16 Claims, 4 Drawing Sheets

(51) Int. Cl.
*H04W 76/28* (2018.01)
*H04W 74/08* (2009.01)
*H04W 76/27* (2018.01)
*H04W 16/14* (2009.01)

(52) U.S. Cl.
CPC ....... *H04W 74/0808* (2013.01); *H04W 76/27* (2018.02); *H04W 76/28* (2018.02)

(58) Field of Classification Search
USPC .......................................................... 370/329
See application file for complete search history.

(56) References Cited

U.S. PATENT DOCUMENTS

| | | | |
|---|---|---|---|
| 2018/0069589 A1* | 3/2018 | Liu | H04B 7/2634 |
| 2018/0124739 A1 | 5/2018 | Tabet et al. | H04W 68/00 |
| 2019/0150114 A1* | 5/2019 | Liu | H04W 52/0248 |
| | | | 370/252 |
| 2019/0342915 A1* | 11/2019 | Kim | H04W 72/0446 |
| 2020/0037367 A1* | 1/2020 | Kim | H04W 74/006 |
| 2020/0229157 A1* | 7/2020 | Rastegardoost | H04L 5/0048 |
| 2020/0344718 A1* | 10/2020 | Ozturk | H04W 24/08 |
| 2020/0351822 A1* | 11/2020 | Roy | H04W 76/27 |
| 2020/0396686 A1* | 12/2020 | Tiirola | H04W 52/0229 |

FOREIGN PATENT DOCUMENTS

| | | |
|---|---|---|
| WO | WO2013067015 A1 | 11/2011 |
| WO | WO2017145120 A1 | 2/2016 |
| WO | WO2017162813 A1 | 3/2016 |
| WO | WO2017166313 A1 | 4/2016 |

OTHER PUBLICATIONS

R2-1903057 3GPP TSG-RAN WG2 Meeting #105-Bis, MediaTek Inc., "Paging Improvement in NR-U", Xi'an, China, Apr. 8-12, 2019 (3 pages) section 2.
International Search Report and Written Opinion of International Search Authority for PCT/CN2020/088220 dated Jul. 29, 2020 (9 pages).
R2-1903776 3GPP TSG-RAN WG2 Meeting #105bis, Fujitsu, "Additional Paging Opportunities for NR-U", Xi'an, China, Apr. 8-12, 2019 (6 pages) section 2.
R2-1904451 3GPP TSG-RAN WG2 Meeting 105bis, Huawei et al., "Consideration on Paging for NR-U", Xi'an, China, Apr. 8-12, 2019 (2 pages) section 2.

* cited by examiner

BACKUP PAGING OPPORTUNITIES IN NEW RADIO UNLICENSED

CROSS REFERENCE TO RELATED APPLICATIONS

This application claims priority under 35 U.S.C. § 119 from U.S. Provisional Application No. 62/841,892, entitled "Introducing Backup Paging Opportunities in NR-U," filed on May 2, 2019, the subject matter of which is incorporated herein by reference.

TECHNICAL FIELD

The disclosed embodiments relate generally to wireless network communications, and, more particularly, to providing additional backup paging opportunities for user equipments (UEs) in new radio unlicensed (NR-U) wireless communications systems.

BACKGROUND

Third generation partnership project (3GPP) and 5G New Radio (NR) mobile telecommunication systems provide high data rate, lower latency and improved system performances. With the rapid development of "Internet of Things" (IOT) and other new user equipment (UE), the demand for supporting machine-type communications increases exponentially. To meet the demand of this exponential increase in communications, additional spectrum (i.e. radio frequency spectrum) is needed. As the amount of licensed spectrum is limited, communications providers need to look to unlicensed spectrum to meet the exponential increase in communication demand. One suggested solution is to use NR over unlicensed spectrum. This solution is referred to as NR-Unlicensed (NR-U). In such a solution, an established communication protocol, such as a 5G carrier can be used entirely over unlicensed spectrum to provide communication links.

In 3GPP NR, 5G terrestrial New Radio (NR) access network (includes a plurality of base stations, e.g., Next Generation Node-Bs (gNBs), communicating with a plurality of mobile stations referred as user equipment (UEs). Orthogonal Frequency Division Multiple Access (OFDMA) has been selected for NR downlink (DL) radio access scheme due to its robustness to multipath fading, higher spectral efficiency, and bandwidth scalability. Multiple access in the downlink is achieved by assigning different sub-bands (i.e., groups of subcarriers, denoted as resource blocks (RBs)) of the system bandwidth to individual users based on their existing channel condition. In LTE and NR networks, Physical Downlink Control Channel (PDCCH) is used for downlink scheduling and Physical Downlink Shared Channel (PDSCH) is used for downlink data. Similarly, Physical Uplink Control Channel (PUCCH) is used for carrying uplink control information and Physical Uplink Shared Channel (PUSCH) is used for uplink data. In addition, physical random-access channel (PRACH) is used for non-contention-based RACH.

One important use of broadcast information in any cellular systems is to set up channels for communication between the gNB and the UE in RRC Idle Mode. This is generally referred to as paging. Paging is a procedure the wireless network uses to find out the location of a UE, in Idle Mode, before the actual connection establishment. Paging is used to alert the UE of an incoming session (call). As paging mostly happens in (RRC) idle mode, UE has to monitor whether the networking is sending any paging message spend some energy to run this "monitoring" process. During idle mode, a UE gets into and stays in sleep mode, defined in discontinuous reception (DRX) cycle. UE periodically wakes up and monitors PDCCH to check for the presence of a paging message. If the PDCCH indicates that a paging message is transmitted in a subframe, then the UE demodulates the paging channel to see if the paging message is directed to it.

Listen-Before-Talk (LBT) is a technique used in radio communications, whereby radio transmitters first sense its radio environment (channel) before it starts any transmission. LBT can be used by a radio device to find a channel the device is allowed to operate on or to find a free radio channel to operate on. In NR-U, any downlink and uplink access have to follow the LBT procedure, as unlicensed frequencies are also used by other networks such as Wi-Fi. Hence, the downlink transmissions over PDCCH and/or PDSCH might suffer from LBT failure. If the UE fails to decode the downlink transmissions in PDCCH or PDSCH, it is impossible for the UE to distinguish the downlink transmission failure resulting from channel impairments or from LBT failure.

Therefore, the paging process in NR-U networks needs further improvement to provide additional paging opportunities to the UE, in order to cope with the possible downlink LBT failure. However, continuous monitoring across multiple paging opportunities is likely to incur more energy consumption of the UE. Any solution for providing additional paging opportunities should also take UE's power consumption into account.

SUMMARY

A method to improve paging process by including additional backup paging opportunities in new radio unlicensed (NR-U) systems is proposed. To cope with the downlink transmission impairments arising from possible listen-before-talk (LBT) failures, NR-U user equipment (UE) can listen to the additional paging opportunities (POs) to obtain the paging message. In an efficient mechanism, additional backup paging opportunities are configured while minimizing the UE's power consumption. The invention also reduces UE's power consumption by configuring short and micro sleep cycles between successive backup paging opportunities. In addition, to avoid continuous listening to the backup paging opportunities, paging monitoring can be suspended for a UE if the LBT is successful and the paging is not intended for the UE.

In one embodiment, a UE receives system information broadcasted from a base station over an unlicensed band in a new radio unlicensed (NR-U) network. The system information comprises a paging control channel (PCCH) configuration. The UE monitors an original paging occasion (PO) over a physical downlink control channel (PDCCH) during a paging cycle. The original PO is subject to a downlink listen-before-talk (LBT) procedure. The UE monitors a backup PO over the PDCCH during the paging cycle. The backup PO and the original PO are separated in time domain by a predefined time duration that is associated to the DL LBT procedure.

Other embodiments and advantages are described in the detailed description below. This summary does not purport to define the invention. The invention is defined by the claims.

DETAILED DESCRIPTION

Reference will now be made in detail to some embodiments of the invention, examples of which are illustrated in the accompanying drawings.

Figure 1:
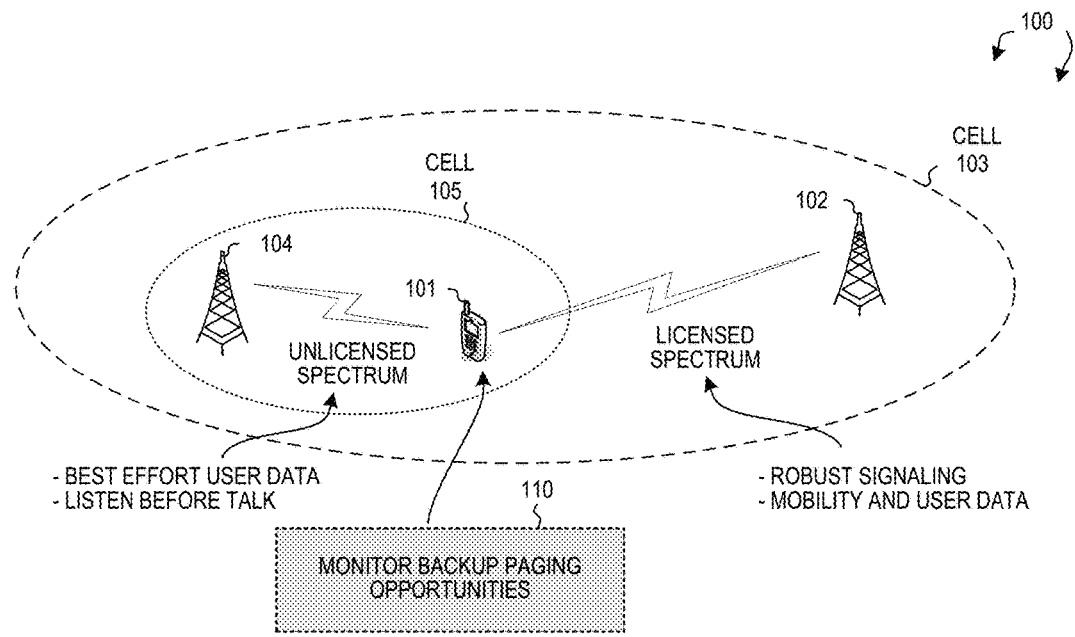
FIG. 1 illustrates an exemplary 5G new radio NR-Unlicensed (NR-U) wireless communications system that supports additional backup paging opportunities in accordance with one novel aspect.

FIG. 1 illustrates an exemplary 5G new radio NR-Unlicensed (NR-U) wireless communications system 100 that supports additional backup paging opportunities in accordance with one novel aspect. NR-U wireless communications system 100 includes one or more wireless communication networks, and each of the wireless communication networks has one or more base infrastructure units, such as gNodeB 102 and gNodeB 104. The base infrastructure units may also be referred to as an access point, an access terminal, a base station, an eNB, a gNB, or by other terminology used in the art. Each of the wireless communication base stations 102 and 104 serves a geographic area. The geographic area served by wireless communications base stations 102 and 104 overlaps in the example of FIG. 1. UE 101 may be equipped with a radio frequency (RF) transceiver or multiple RF transceivers for different application services. UE 101 may be a smart phone, a wearable device, an Internet of Things (IoT) device, and a tablet, etc.

Base station 102 is a licensed base station that communicates with UE 101 via a licensed frequency band. In one example, base station 102 communicates with UE 101 via 5G NR wireless communication. Base station 102 provides wireless communication to multiple UEs within cell 103. Base station 104 is an unlicensed base station that communicates with UE 101 via an unlicensed frequency band. In one example, base station 104 communicates with UE 101 via 5G NR wireless communication. Base station 104 can communicate with multiple UEs with cell 105. Note that, FIG. 1 is an illustrative plot. The base station 102 and base station 104 can be co-located geographically. Also note the NR-U can operate as both licensed cell and unlicensed cell, and as both primary cell as well as secondary cell.

The exponential growth in data consumption has created large bandwidth demands that cannot be met by current wireless systems. To meet this ever-increasing demand for data, new wireless systems with greater available bandwidth are needed. New Radio-Unlicensed (NR-U) wireless networks can be used to provide greater available bandwidth. An NR-U network utilizes unlicensed frequency bands in addition to licensed frequency bands contemporaneously, thereby provided additional available bandwidth to the UEs in the wireless system. For example, UE 101 can benefit from simultaneous use of the licensed frequency band and the unlicensed frequency band in an NR-U network. The NR-U network not only provides additional bandwidth for greater overall data communication, but also provide consistent data connectivity due to the presence of two separate data links. Having multiple data links available increases the probability that the UE will be able to achieve proper data communication with at least one base station at any given moment.

One important use of broadcast information in any cellular systems is to set up channels for communication between the gNB and the UE in RRC idle mode. This is generally referred to as paging. Paging is a procedure the wireless network uses to find out the location of a UE, before the actual connection establishment. Paging is used to alert the RRC Idle UE of an incoming session (call). During RRC idle mode, UE 101 stays in sleep mode defined in discontinuous reception (DRX) cycle. UE 101 goes to sleep and periodically wakes up and monitors a physical downlink control channel (PDCCH) to check for the presence of a paging message. If the PDCCH indicates that a paging message is transmitted in a subframe, then UE 101 demodulates the paging channel to see if the paging message is directed to it.

To facilitate efficient and fair spectrum sharing, a dynamic spectrum sharing mechanism called listen-before-talk (LBT) procedure needs to be followed for all downlink and uplink transmission in NR-U, as unlicensed frequencies are also used by other networks such as Wi-Fi. Downlink DL LBT is required for DL transmission and uplink UL LBT is required for UL transmission. Hence, downlink transmissions over a physical downlink control channel (PDCCH) and/or a physical downlink shared channel (PDSCH) may suffer from LBT failure. If UE 101 fails to decode the downlink transmissions in PDCCH or PDSCH, it is impossible for UE 101 to distinguish the downlink transmission failure resulting from channel impairments or LBT failure. Therefore, the paging process in NR-U networks needs further improvement to provide additional paging opportunities to the UE, in order to cope with the possible DL LBT failure. However, continuous monitoring across multiple paging opportunities is likely to incur more energy consumption of the UE.

In accordance with one novel aspect, a method to improve paging process by including additional backup paging opportunities (POs) in a new radio unlicensed (NR-U) system 100 is proposed. As depicted by 110, to cope with the DL transmission impairments arising from possible DL LBT failures, NR-U UE 101 monitors the additional backup paging opportunities to obtain the paging message. In an efficient mechanism, additional backup paging opportunities are configured while minimizing the power consumption of UE 101. The invention also reduces the power consumption of UE 101 by configuring short and micro sleep cycles between successive backup paging opportunities. In addition, to avoid continuous listening to the additional backup paging opportunities, paging monitoring can be suspended for UE 101 if the DL LBT is successful but the paging message is not intended for UE 101.

Figure 2:
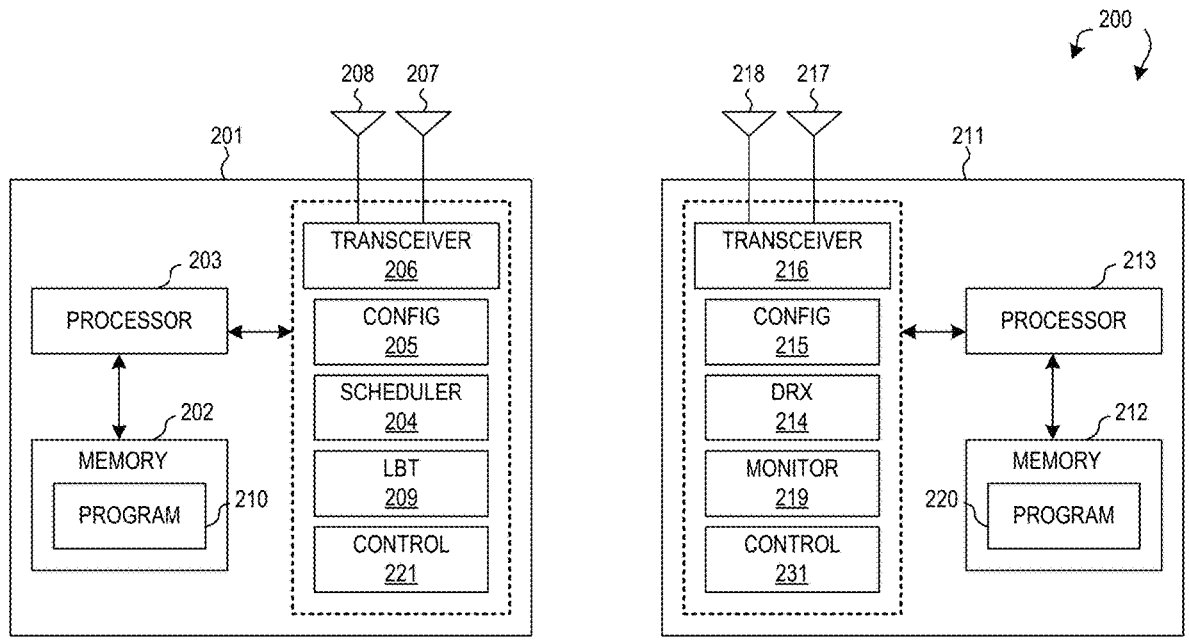
FIG. 2 is a simplified block diagram of a wireless transmitting device and a receiving device in accordance with embodiments of the present invention.

FIG. 2 is a simplified block diagram of wireless devices 201 and 211 in accordance with embodiments of the present invention. For wireless device 201 (e.g., a transmitting device), antennae 207 and 208 transmit and receive radio signal. RF transceiver module 206, coupled with the antennae, receives RF signals from the antennae, converts them to baseband signals and sends them to processor 203. RF transceiver 206 also converts received baseband signals from the processor, converts them to RF signals, and sends out to antennae 207 and 208. Processor 203 processes the received baseband signals and invokes different functional modules and circuits to perform features in wireless device 201. Memory 202 stores program instructions and data 210 to control the operations of device 201.

Similarly, for wireless device 211 (e.g., a receiving device), antennae 217 and 218 transmit and receive RF signals. RF transceiver module 216, coupled with the antennae, receives RF signals from the antennae, converts them to baseband signals and sends them to processor 213. The RF transceiver 216 also converts received baseband signals from the processor, converts them to RF signals, and sends out to antennae 217 and 218. Processor 213 processes the received baseband signals and invokes different functional modules and circuits to perform features in wireless device 211. Memory 212 stores program instructions and data 220 to control the operations of the wireless device 211.

The wireless devices 201 and 211 also include several functional modules and circuits that can be implemented and configured to perform embodiments of the present invention. In the example of FIG. 2, wireless device 201 is a base station that includes a configuration handling module 205, a scheduler 204, an LBT circuit 209, and a control circuit 221. Wireless device 211 is a UE that includes a configuration handling module 215, a DRX module 214, a monitoring circuit 219, and a control circuit 231. Note that a wireless device may be both a transmitting device and a receiving device. The different functional modules and circuits can be implemented and configured by software, firmware, hardware, and any combination thereof. Each functional module or circuit may comprise a processor with corresponding program codes. The function modules and circuits, when executed by the processors 203 and 213 (e.g., via executing program codes 210 and 220), allow transmitting device 201 and receiving device 211 to perform embodiments of the present invention.

In one example, the base station 201 provides system information and configuration information to UEs via configuration handing circuit 205, schedules downlink and uplink transmission for UEs via scheduler 204, performs downlink LBT procedure before downlink transmission via LBT circuit 209, and controls other operation of UEs via control circuit 221. The UE 211 obtains system information and configuration from the base station via configuration handing circuit 215, performs DRX operation in RRC idle mode via DRX module 214, monitors PDCCH for paging messages via monitoring circuit 219, and controls other operation of UE 211 via circuit 231. In accordance with one novel aspect, UE 211 is configured with additional backup paging occasions by the network and monitors PDCCH for the paging message. UE 211 enters short and micro sleep cycles between successive backup POs, and suspend continuous monitoring PDCCH for backup POs if the previous DL LBT procedure is successful but the paging message is not intended for UE 211.

Figure 3:
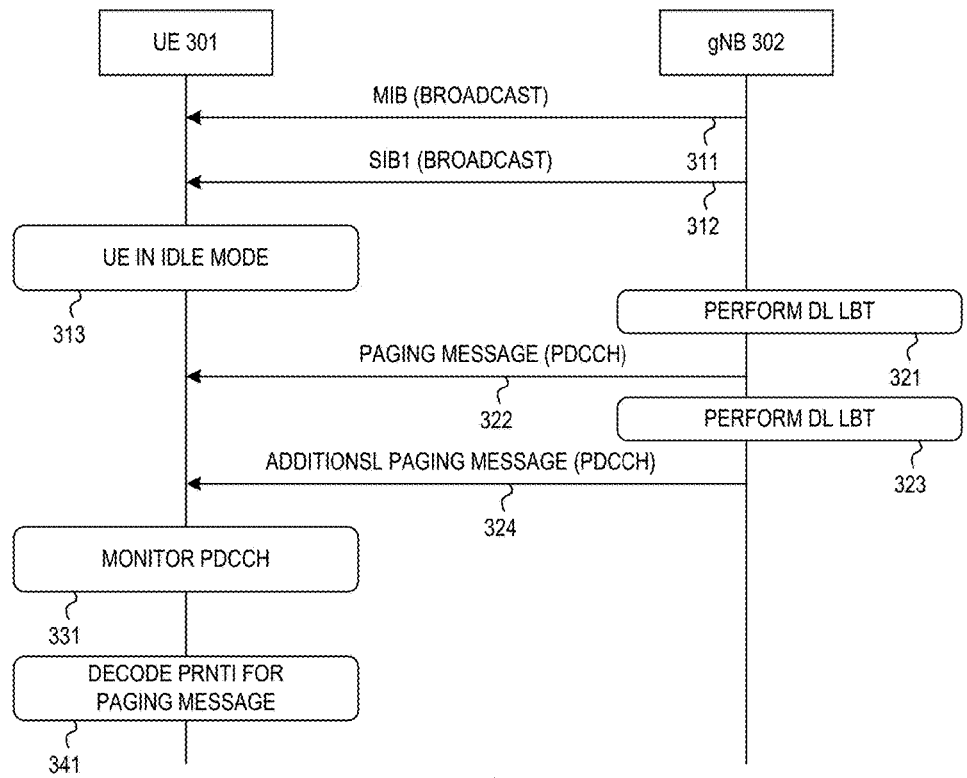
FIG. 3 illustrates a paging message flow between a UE and a base station with Listen Before Talk (LBT) in 5G NR-U in accordance with one novel aspect.

FIG. 3 illustrates a paging message flow between a UE and a base station with a Listen Before Talk (LBT) in 5G NR-U in accordance with one novel aspect. In step 311, UE 301 receives master information block (MIB) broadcasted from gNB 302. The MIB comprises bandwidth info, control channel decoding and system frame number (SFN). In step 312, UE 301 receives system information block (SIB) type 1, e.g., SIB1 broadcasted from gNB 302. The SIB1 provides cell selection parameters and scheduling information for the remaining SIBs. SIB1 (IE DownlinConfigCommonSIB) comprises paging control channel (PCCH) configuration, including Paging Frames, Paging Cycles, Paging Occasions (POs), and PDCCH monitoring occasions, where (a) PCCH configuration provides the configurations required for paging information (b) Paging Frames represent the system-frames in which Paging Occasions (POs) are configured (c) Paging Cycles represent the periodic Idle Mode DRX (Discontinuous Reception) cycle in which UE periodically wakes up for monitoring PDCCH information and (d) Paging Occasions represent the exact sub-frame in which the UE monitors the PDCCH. UE 301 also receives additional system information periodically or upon request (not shown). In step 313, UE 301 performs cell selection and camps on a cell served by base station gNB 302. UE 301 is in radio resource control (RRC) idle mode and has not established an RRC connection. During RRC idle mode, UE 301 stays in sleeping mode defined in discontinuous reception (DRX) cycle. UE 301 periodically wakes up and monitors PDCCH to check for the presence of a paging message. If the PDCCH indicates that a paging message is transmitted in a subframe, then UE 301 demodulates the paging channel, e.g., decodes the paging network temporary identifier (PRNTI) carried in the PDCCH to see if the paging message is directed to UE 301.

In NR-U, LBT procedure needs to be followed for all downlink and uplink transmission, as unlicensed frequencies are also used by other networks such as Wi-Fi. In general, LBT is used by a radio device to find a channel the device is allowed to operate on or to find a free radio channel to operate on. Hence, the base station performs downlink LBT for DL transmission, and UE performs uplink LBT for UL transmission. 3GPP has classified different LBT schemes according to four different LBT categories. LBT Category 4 is selected as the default LBT for paging transmission. For Category 4 (LBT with random backoff with a contention window of variable size), the transmitting entity draws a random number $N_{CW}$ within a contention window. The size of the contention window is specified by the minimum and maximum value of $N_{CW}$. The transmitting entity can vary the size of the contention window when drawing the random number $N_{CW}$. The random number $N_{CW}$ is used in the LBT procedure to determine the duration of time that the channel is sensed to be idle before the transmitting entity transmits on the channel. Note that a Category 4 LBT procedure takes longer time and has lower success rate as compared to other LBT procedures.

In step 321, gNB 302 performs DL LBT for paging transmission over PDCCH. If the DL LBT is successful, in step 322, gNB 302 transmits the paging message over PDCCH to UE 301. On the other hand, the paging transmission may suffer from DL LBT failure and gNB 302 is not able to transmit the paging message to UE 301 for the configured paging occasion. To cope with the possible DL LBT failure, additional paging occasions are being configured for UEs. In step 323, gNB 302 performs another DL LBT for paging transmission over PDCCH. If the DL LBT is successful, in step 324, gNB 302 transmits the paging message over PDCCH to UE 301. Multiple additional paging occasions can be configured. In step 331, UE 301 periodically wakes up for monitoring PDCCH and checks the presence of a paging message. In step 341, if the PDCCH indicates that a paging message is transmitted, UE 301 decodes the PRNTI to see if the paging message is directed to UE 301.

Figure 4:
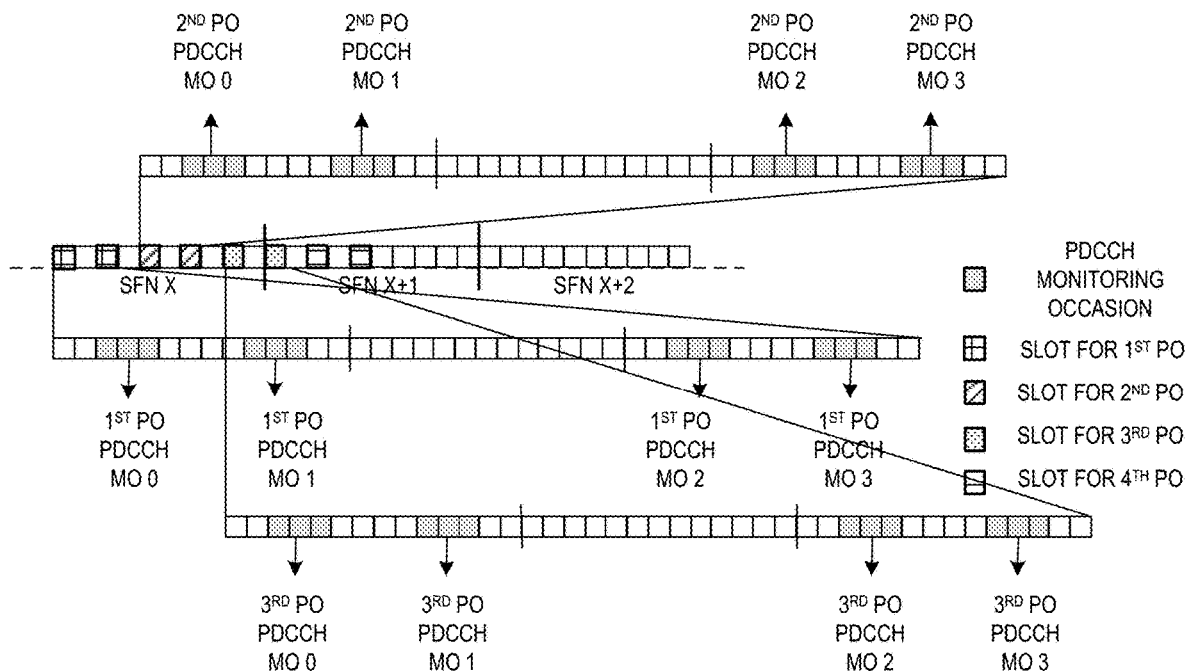
FIG. 4 illustrates paging configuration with different configuration parameters in 5G NR-U.

FIG. 4 illustrates paging configuration with different configuration parameters in 5G NR-U. As shown in FIG. 4, frames, including Paging Frames (PF) are the frames marked as System Frame Number (SFN). Typically, an SFN or a frame is 10 ms long. Subframes are typically 1 ms long, i.e., every frame is made up of 10 subframes. Slots for POs are also marked with shades. Typically, one slot is one subframe, but one PO can have multiple slots (multiple subframes). In NR, gNB explicitly configures paging channel PCCH parameters via SIB1. The PCCH parameters include N represents the number of Paging Frames (PF) per DRX cycle, Ns represents the number of Paging Occasions (PO) per PF, and T represents Paging Cycle or Idle Mode DRX Cycle, in which UE periodically wakes up to monitor PDCCH. Note that the Paging Cycle or Idle Mode DRX Cycle T is too long to be shown in FIG. 4. In the example of FIG. 4, N=T/2, Ns=4, 4 beams, PDCCH monitoring occasions (MOs) in every second slot. UE monitors the PO pointed to by index i_s (non-default association). The formula used for calculating PF is as follows:

For PO-SSB default association,
  PF: SFN+PF_offset mod T=(T div N)*(UE_ID mod N) and
  PO: align with SSB.

For PO-SSB non-default association,
  PF: SFN mod T=(T div N)*(UE_ID mod N) and
  PO: UE monitors the PO pointed to by index i_s Therefore, a NR PF, represented by SFN X, can have POs in the slots spanning across subsequent SFNs (e.g. SFN X+1, SFN X+2, ... ). Furthermore, in NR-U, the network needs to specify additional backup POs to cope up with possible DL LBT failure, while taking care of UE's power consumptions as well.

The network gNB can configure the additional backup Pos explicitly by using the same PCCH in SIB1 (IE DownlinkConfigCommonSIB). There can be two possible ways to configure the additional backup POs to combat LBT failures during DL paging message transmissions. In a first embodiment, backup paging opportunities can be configured by additional (multiples of) PDCCH monitoring occasions, e.g. from S consecutive PDCCH monitoring in NR to S*b consecutive PDCCH monitoring occasions in NR-U, where b represents additional backup PDCCH monitoring occasions configured for each of S original PDCCH monitoring occasions and 'S' is the number of actual transmitted SSBs determined according to ssb-PositionsInBurst in SIB'. Along with S, b can also be informed to the UE, using "PCCH-Config" in SIB', e.g., via step 312 in FIG. 3. In a second embodiment, instead of explicitly configuring as additional PDCCH monitoring occasions, NR-U gNB can configure additional backup Paging Occasions (POs).

Figure 5:
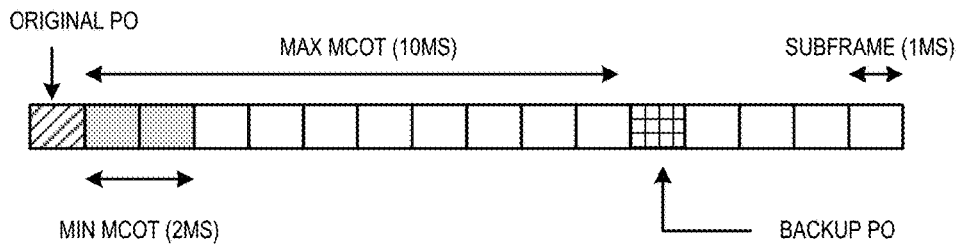
FIG. 5 illustrates a first embodiment of configuring a single additional backup paging occasion in a paging frame.

FIG. 5 illustrates a first embodiment of configuring a single additional backup paging occasion in a paging frame. As Category 4 LBT will be used as the default configuration for paging transmission, the maximum channel occupancy time (MCOT) duration after an LBT failure will be 2 ms~10 ms, e.g., the min MCOT is 2 min, and the max MCOT is 10 ms. Hence, as shown in FIG. 5, if LBT fails for the original PO, it seems reasonable to assume that NR-U gNB needs to wait for at least 2~10 sub-frames to avoid the occupied channel for ensuring channel accessibility for transmission of paging message. Hence, if POs are configured in consecutive slots, it will be inefficient during LBT failure because it is likely that the channel is still occupied within MCOT by another device. The NR-U gNB might waste many of these slots due to inaccessibility of the channel, arising from LBT failure and MCOT restriction. This will lead to the reduction of effective paging capacity. As a result, an effective solution is to ensure that backup POs follow MCOT restrictions, i.e. the time duration of the backup PO from the original PO should be around MCOT (e.g., ~ max MCOT=10 ms).

Figure 6:
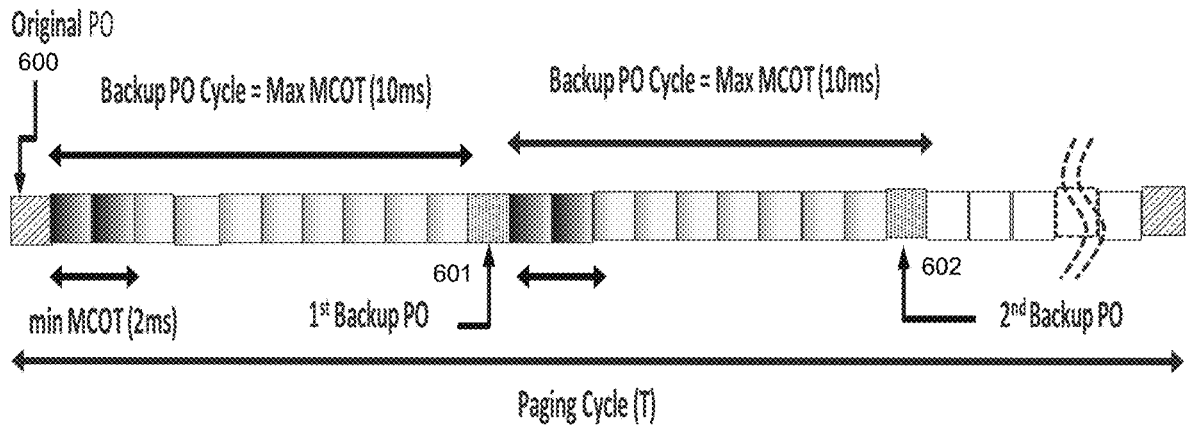
FIG. 6 illustrates a second embodiment of configuring multiple additional backup paging occasions with backup PO cycle.

FIG. 6 illustrates a second embodiment of configuring multiple additional backup paging occasions in regular intervals. Depending on the original PO configuration, multiple additional backup POs can be configured for every original PO. These multiple backup POs (e.g., first backup PO 601 and second backup PO 602) can be configured at a specific, regular interval (or cycle). Such interval or cycle can be referred to as "Backup PO Cycle". The Original Paging Cycle T will be some multiples of the Backup PO cycles, or in other words, Backup PO cycle will be some fraction of the Original Paging Cycle T. As Category 4 LBT is selected as the default LBT procedure for paging, backup PO cycle will also adhere to the similar MCOT restriction. Because the MCOT duration after an LBT failure will be 2 ms~10 ms, it is safe to maintain the backup PO cycle to be around 2 ms~10 ms. The gNB can configure the number of backup POs and the backup PO cycle length in the PCCH-Config, e.g., inside DownlinkConfigCommonSIB IE.

Similar to single backup PO, a backup PO cycle, consisting of multiple backup POs at regular interval, also need to adhere to the MCOT restrictions. In other words, backup POs (e.g., PO 601 and PO 602) should be separated with enough space in time domain, such that, after LBT failure, the probability of channel being busy is reduced and MCOT restrictions are maintained. Furthermore, the NR-U gNB needs to include a parameter for mentioning number of Backup POs, per original PO, for example, two backup POs (601 and 602) per original PO 600. This could be done by configuring additional PDCCH monitoring, or by explicitly configuring the number of backup POs in PCCH-Config inside DownlinkConfigCommonSIB IE. The NR-U gNB can also include a parameter for configuring the Backup PO Cycle in PCCH-Config inside DownlinkConfigCommonSIB IE.

Figure 7:
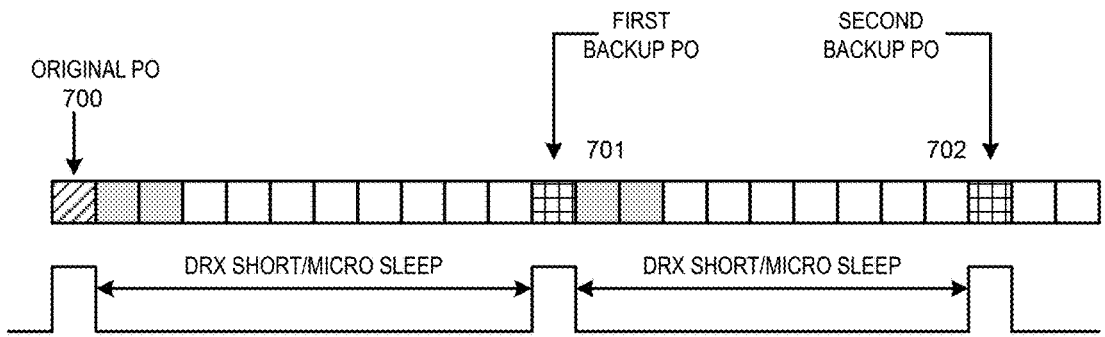
FIG. 7 illustrates a third embodiment of UE state transition between DRX sleep and PDCCH monitoring states for paging occasions.

FIG. 7 illustrates a third embodiment of UE state transition between DRX sleep and PDCCH monitoring states for paging occasions. The solution of introducing additional paging opportunities needs to consider UE's power consumption. As monitoring any additional PO will lead to additional power consumption, the extra power consumption needs to be minimized. As depicted in FIG. 7, UE can perform this power savings by switching to DRX sleep states between monitoring successive backup POs. Under DRX operation, UE wakes up to monitor PDCCH for original PO 700, and for the additional backup PO 701 and PO 702. UE goes back to DRX short sleep or micro sleep in between the PDCCH monitoring. Furthermore, UE will suspend monitoring any subsequent backup PO in the PF, if for a previous PO, LBT is successful and UE decodes the PRNTI, but UE cannot find any paging message that is intended for itself. In other words, if a UE decodes a paging message from backup PO 701 but the paging message is not direct to itself, then the UE will suspend monitoring backup PO 702. In addition, explicit short RRC signaling message, or sent using DCI, can be used to indicate to the UE to stop paging monitoring.

Figure 8:
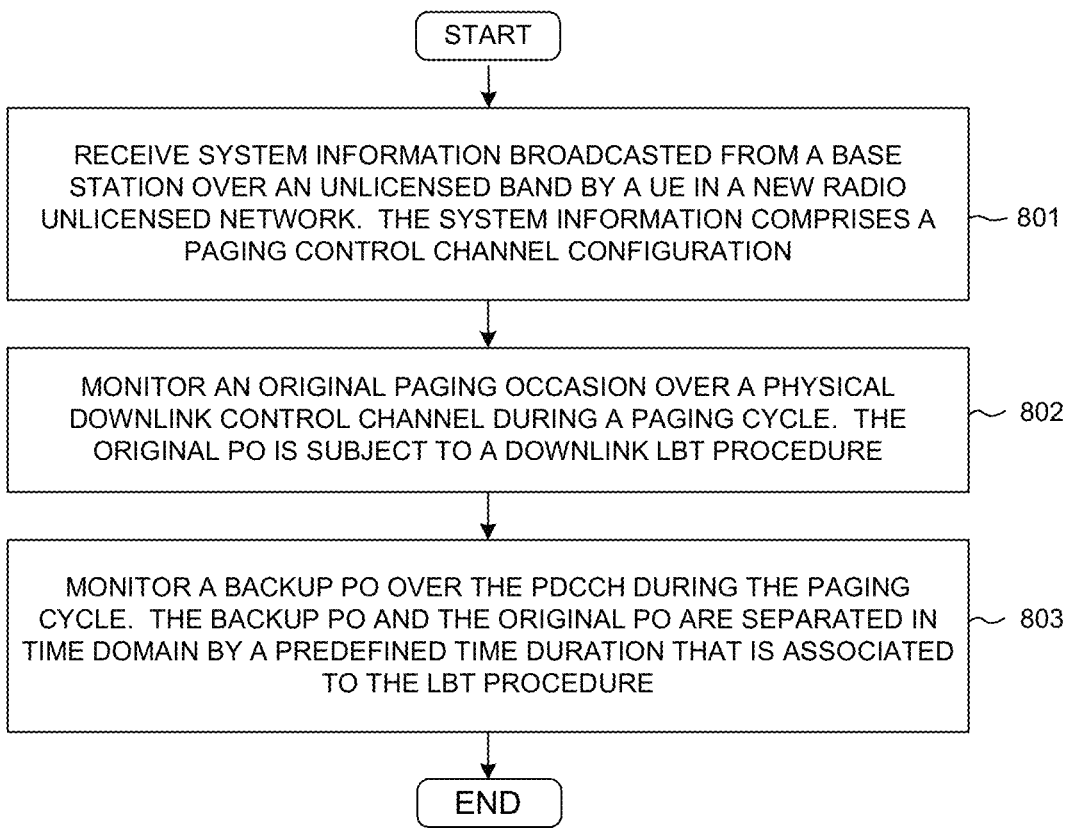
FIG. 8 is flow chart of a method of configuring additional backup paging opportunities in 5G NR-U in accordance with one novel aspect.

FIG. 8 is flow chart of a method of configuring additional backup paging opportunities in 5G NR-U in accordance with one novel aspect. In step 801, a UE receives system information broadcasted from a base station over an unlicensed band in a new radio unlicensed (NR-U) network. The system information comprises a paging control channel (PCCH) configuration. In step 802, the UE monitors an original paging occasion (PO) over a physical downlink control channel (PDCCH) during a paging cycle. The original PO is subject to a downlink listen-before-talk (LBT) procedure. In step 803, the UE monitors a backup PO over the PDCCH during the paging cycle. The backup PO and the original PO are separated in time domain by a predefined time duration that is associated to the DL LBT procedure.

Although the present invention has been described in connection with certain specific embodiments for instructional purposes, the present invention is not limited thereto. Accordingly, various modifications, adaptations, and combinations of various features of the described embodiments can be practiced without departing from the scope of the invention as set forth in the claims.

What is claimed is:

1. A method comprising:
   receiving system information broadcasted from a base station over an unlicensed band by a user equipment (UE) in a new radio unlicensed (NR-U) network, wherein the system information comprises a paging control channel (PCCH) configuration;
   monitoring an original paging occasion (PO) over a physical downlink control channel (PDCCH) during a paging cycle, wherein the original PO is subject to a downlink listen-before-talk (LBT) procedure; and
   monitoring a backup PO over the PDCCH during the paging cycle, wherein the backup PO and the original PO are separated in time domain by a predefined time duration that is associated to the DL LBT procedure, wherein the backup PO is configured by configuring additional POs in regular intervals, and wherein the PCCH configuration comprises configuring a number of backup POs and a backup PO cycle length for every original PO.

2. The method of claim 1, wherein the DL LBT procedure is a category 4 LBT procedure associated with a maximum channel occupancy time (MCOT).

3. The method of claim 2, wherein the predefined time duration between the backup PO and the original PO is determined based on the MCOT.

4. The method of claim 1, wherein the PCCH configuration comprises at least a number of paging frames per discontinuous reception (DRX) cycle, and a number of POs per paging frame.

5. The method of claim 1, wherein the monitoring of the backup PO involves configuring additional PDCCH monitoring occasions via the PCCH configuration.

6. The method of claim 1, wherein multiple additional POs are configured for every original PO, and wherein the multiple additional POs are separated by the predefined time duration with each other.

7. The method of claim 1, wherein the UE is in radio resource control (RRC) idle mode with a discontinuous reception (DRX) operation, and wherein the UE goes to DRX short sleep or DRX micro sleep between backup POs during the backup PO cycle.

8. The method of claim 1, wherein the UE suspends the monitoring for the backup PO when the UE detects a paging message that is intended for other UEs.

9. The method of claim 1, wherein the UE stops the monitoring for the backup PO upon receiving an explicit signaling message from the base station.

10. A User Equipment (UE), comprising:
    a receiver that receives system information broadcasted from a base station over an unlicensed band in a new radio unlicensed (NR-U) network, wherein the system information comprises a paging control channel (PCCH) configuration;
    monitoring an original paging occasion (PO) over a physical downlink control channel (PDCCH) during a paging cycle, wherein the original PO is subject to a downlink listen-before-talk (LBT) procedure; and
    monitoring a backup PO over the PDCCH during the paging cycle, wherein the backup PO and the original PO are separated in time domain by a predefined time duration that is associated to a maximum channel occupancy time (MCOT) of the DL LBT procedure, wherein the backup PO is configured by configuring additional POs in regular intervals, and wherein the PCCH configuration comprises configuring a number of backup POs and a backup PO cycle length for every original PO.

11. The UE of claim 10, wherein the PCCH configuration comprises at least a number of paging frames per discontinuous reception (DRX) cycle, and a number of POs per paging frame.

12. The UE of claim 10, wherein the monitoring of the backup PO involves configuring additional PDCCH monitoring occasions via the PCCH configuration.

13. The UE of claim 10, wherein multiple additional POs are configured for every original PO, and wherein the multiple additional POs are separated by the predefined time duration with each other.

14. The UE of claim 10, wherein the UE is in radio resource control (RRC) idle mode with a discontinuous reception (DRX) operation, and wherein the UE goes to DRX short sleep or DRX micro sleep between backup POs during the backup PO cycle.

15. The UE of claim 10, wherein the UE suspends the monitoring for the backup PO when the UE detects a paging message that is intended for other UEs.

16. The UE of claim 10, wherein the UE suspends the monitoring for the backup PO upon receiving an explicit signaling message from the base station.

\* \* \* \* \*